United States Patent
Druon

(10) Patent No.: US 8,267,697 B2
(45) Date of Patent: Sep. 18, 2012

(54) EDUCATIONAL EQUIPMENT WITH MULTIPLE CONFIGURATIONS

(75) Inventor: Jean-Loup Druon, Beruges (FR)

(73) Assignee: Jean-Loup Druon, Beruges (FR)

( * ) Notice: Subject to any disclaimer, the term of this patent is extended or adjusted under 35 U.S.C. 154(b) by 488 days.

(21) Appl. No.: 12/597,010

(22) PCT Filed: Apr. 14, 2008

(86) PCT No.: PCT/FR2008/000520
§ 371 (c)(1),
(2), (4) Date: Nov. 16, 2009

(87) PCT Pub. No.: WO2008/142292
PCT Pub. Date: Nov. 27, 2008

(65) Prior Publication Data
US 2010/0120001 A1    May 13, 2010

(30) Foreign Application Priority Data
Apr. 26, 2007 (FR) .................... 07 03040

(51) Int. Cl.
*G09B 29/00* (2006.01)
(52) U.S. Cl. ........................ 434/430
(58) Field of Classification Search ........... 434/156, 434/161, 167, 171, 172, 176; 40/5, 489–491, 40/618
See application file for complete search history.

(56) References Cited

U.S. PATENT DOCUMENTS

| | | | |
|---|---|---|---|
| 1,584,627 A * | 5/1926 | Marino | 434/159 |
| 3,172,214 A * | 3/1965 | Aberge et al. | 434/167 |
| 3,826,500 A | 7/1974 | Stratta | |
| 4,682,430 A * | 7/1987 | Ramsay | 40/5 |
| 4,979,324 A * | 12/1990 | Rehtmeyer et al. | 40/490 |
| 5,087,052 A | 2/1992 | Simon | |
| 5,088,221 A * | 2/1992 | Bussiere et al. | 40/618 |
| 5,203,706 A * | 4/1993 | Zamir | 434/172 |
| 5,588,238 A * | 12/1996 | Visocky et al. | 40/618 |
| 5,788,503 A * | 8/1998 | Shapiro et al. | 434/172 |
| 6,490,818 B1 * | 12/2002 | Bramhall et al. | 40/491 |
| 6,626,675 B1 * | 9/2003 | Webber | 434/156 |
| 6,743,020 B2 * | 6/2004 | Pestl | 434/100 |
| 7,011,525 B2 * | 3/2006 | Mejia | 434/167 |

FOREIGN PATENT DOCUMENTS

| | | |
|---|---|---|
| FR | 2678175 A1 | 12/1992 |
| GB | 2408835 A | 6/2005 |
| WO | 03103786 A1 | 12/2003 |

* cited by examiner

*Primary Examiner* — Kurt Fernstrom
(74) *Attorney, Agent, or Firm* — McCracken & Frank LLC

(57) ABSTRACT

The invention relates to educational equipment comprising a plurality of information support means (1) having identical dimensions but bearing at least partly different information. According to the invention, each support means (1) takes the form of a board comprising an outer frame (2) into which are inserted, removably and with friction, at least two inner frames (3), into each of which are inserted, removably and with friction, at least two labels (4) bearing the information.

10 Claims, 3 Drawing Sheets

EDUCATIONAL EQUIPMENT WITH MULTIPLE CONFIGURATIONS

The invention generally concerns the rationalized design of supporting media for game and/or didactic activities.

More precisely, the invention concerns educational material comprising a plurality of information media of identical dimensions, carrying data that is at least partly different.

Numerous existing or future games meet or may meet this definition.

This is notably the case with the game of dominos, which comprises twenty-eight rectangular elements with two faces, one of these faces carrying two boxes of which each contains a number of dots of between zero and six.

This is also the case with bingo games which comprise individual boards divided into squares carrying random numbers, and numbered tokens which the different players draw in turn and endeavour to match as quickly as possible with a number on the board or boards they hold.

This is also the case with memory games which comprise illustrative cards, called vignettes, to be associated in identical or corresponding pairs.

Since different games typically require different specific configurations and/or different methods of use, the material associated with a game is generally dedicated to this game and hence unsuitable for playing another game.

As a result, the playing of different games in theory requires the availability of an equivalent number of items of equipment, each being dedicated to one of these games.

It is known to remedy this situation at least in part by printing different data on the two faces of one same medium e.g. a chessboard on a first face of a game board and a chequer-board on the other face of this board.

Within this context, the purpose of the invention is to propose another integration solution, allowing the use of one same item of equipment in several possible configurations and thereby making this equipment suitable for playing several different games.

For this purpose, the equipment of the invention, conforming to the generic definition given in the above preamble, is essentially characterized in that each medium is in the form of a board comprising an outer frame, at least two inner frames, and at least four vignettes carrying at least part of said data, in that the outer frame of each board has at least two main windows in each of which one of said inner frames is removably inserted, in that each inner frame of each board has at least two auxiliary windows in each of which one of said vignettes is removably inserted, in that the main windows, the inner frames, the auxiliary windows and the vignettes of all the boards have respective identical dimensions, the inner frames therefore being mutually interchangeable and the vignettes also being interchangeable with each other, and in that each insert consisting of an inner frame inserted in a main window or of a vignette inserted in an auxiliary window is joined to the window in which it is inserted by a friction force exerted between the edge of this insert and the edge of this window.

Preferably, the outer frame, the inner frames, and the vignettes of each board are of identical thickness, common to all the boards.

The outer frame, the inner frames, the vignettes of each board may, for example, have a thickness of between 0.8 and 12 millimetres, preferably between 1.5 and 5 millimetres.

It can particularly be contemplated to form each board by cut-out from a cardboard, wood or plastic blank, this cutting preferably being achieved by punching or optionally using laser or water-jet.

Each board may have three main windows for example and three inner frames, each inner frame possibly having two auxiliary windows and two vignettes.

In one possible embodiment of the invention, the main windows and the inner frames of each board are rectangular, whilst the auxiliary windows and the vignettes of each inner frame are square.

Also, the equipment of the invention preferably comprises at least first and second sets of vignettes, the vignettes of one same set all carrying different data, whereas each vignette of each of the first and second sets of vignettes may comprise identical data or data corresponding to that of a vignette of the other of these first and second sets of vignettes.

Other characteristics and advantages of the invention will become more clearly apparent from the following description given by way of indication and in no way limiting, with reference to the appended drawings, in which.

Figure 1:
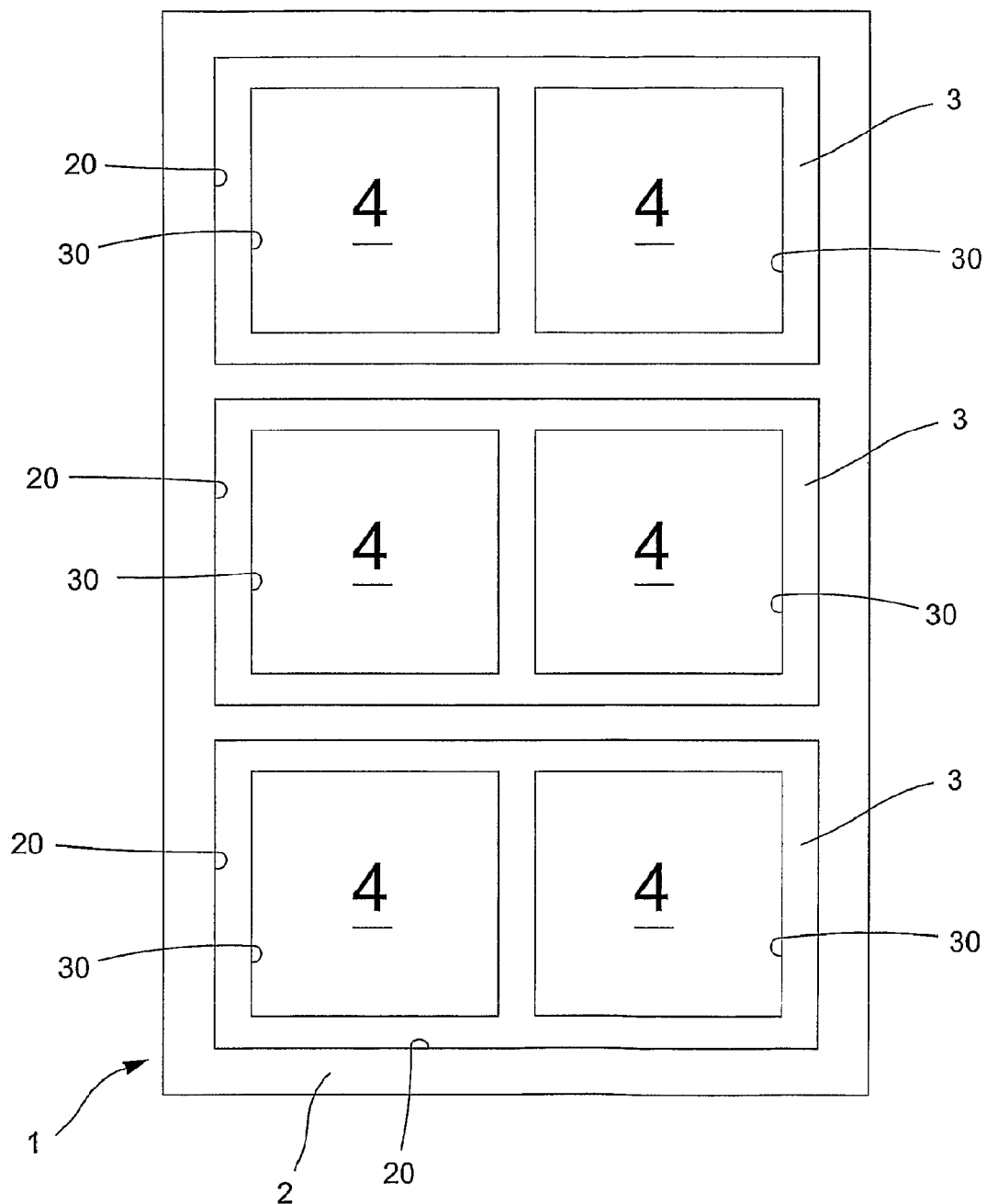
FIG. 1 is a view of a first possible face of a board in the equipment conforming to the invention.

As stated above, the invention concerns educational material which comprises a plurality of data media of identical dimensions, these different media carrying data which differs at least in part from one medium to another.

The invention is in no way limited to a particular semantic content, or to a specific material form of such data, which therefore form parameters extrinsic to this invention.

In particular, such data may be of picture type, alphabetic or numeral type, and it may be affixed to these media by printing, embossing or any other technique.

According to the invention, each medium is in the form a of a board 1 which, in a complete configuration, comprises an outer frame 2, two or more inner frames 3, and at least four vignettes 4, the data offered by this board preferably being exclusively carried by the vignettes 4.

The outer frame 2 of each board 1 has at least two main windows 20, preferably of elongate shape, the embodiment illustrated in the figures having three main windows of rectangular shape.

Each main window 20 receives an inner frame 3, whose shape matches the shape of the window, and which is removably inserted therein.

Also, each inner frame 3 of each board 1 has at least two auxiliary windows 30 of triangular shape, square shape, or having an even higher degree of symmetry.

Although the embodiment illustrated in the figures only comprises two auxiliary windows of square shape, these windows 30 could also be greater in number and/or be of circular shape for example.

In the complete configuration of the board, a vignette 4 whose shape matches the shape of an auxiliary window 30 is removably inserted in each of these auxiliary windows 30.

According to one important characteristic of the invention, the main windows 20, the inner frames 3, the auxiliary windows 30, and the vignettes 4 of all the boards 1 have respective identical dimensions.

By means of this characteristic, the inner frames 3 of one same board or of different boards can be mutually interchanged, as can the vignettes 4 of one same board or of different boards.

Also, each inner frame 3 inserted in a main window 20 is joined to the window in which it is inserted by a friction force exerted between the peripheral edge of this inner frame and the edge of this main window.

Similarly, each vignette 4 inserted in an auxiliary window 30 is joined to the window in which it is inserted by a friction force exerted between the peripheral edge of this vignette and the edge of this auxiliary window.

For this purpose, each board 1 is preferably made by punch-cutting from a relatively flexible cardboard blank, cutting therefore being made without any substantial loss of material or reduction in size of the cut pieces. It is nonetheless possible to produce the boards in wood or plastic material, and to use laser or water-jet cutting.

At all events, it may be judicious to make provision so that the outer frame 2, the inner frames 3, and the vignettes 4 of each board 1 are of identical thickness, common to all the boards and for example lying between 0.8 and 12 millimetres, preferably between 1.5 and 5 millimetres, and further preferably between 1.5 and 2.5 millimetres.

Preferably, the equipment of the invention comprises at least two sets of vignettes 4 so that the vignettes of one same set all carry different data, whereas each vignette of each of these sets carries identical data or data corresponding to the data of a vignette in the other set, the relationship being established by any physical characteristic or suitable semantic relationship.

In other words, each vignette of each of these sets is distinguishable from every other vignette in this same set, and identical or able to be associated with one and only vignette in the other set, irrespective of the type and/or form of the data carried by the different vignettes.

Figure 2:
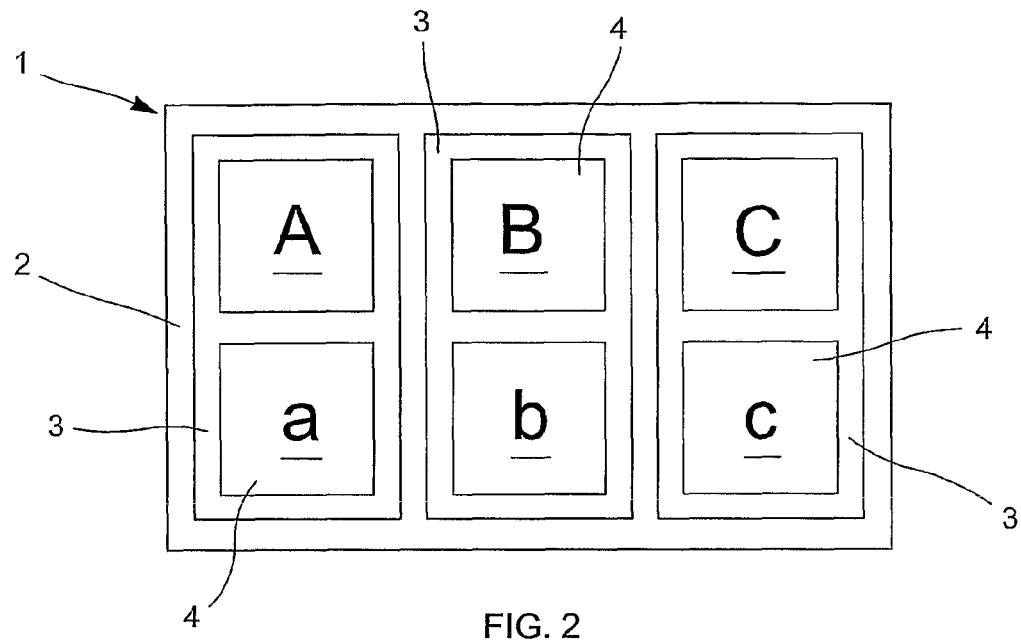
FIG. 2 is a view, on a smaller scale, of a possible second face of a board in the equipment conforming to the invention.
Figure 3:
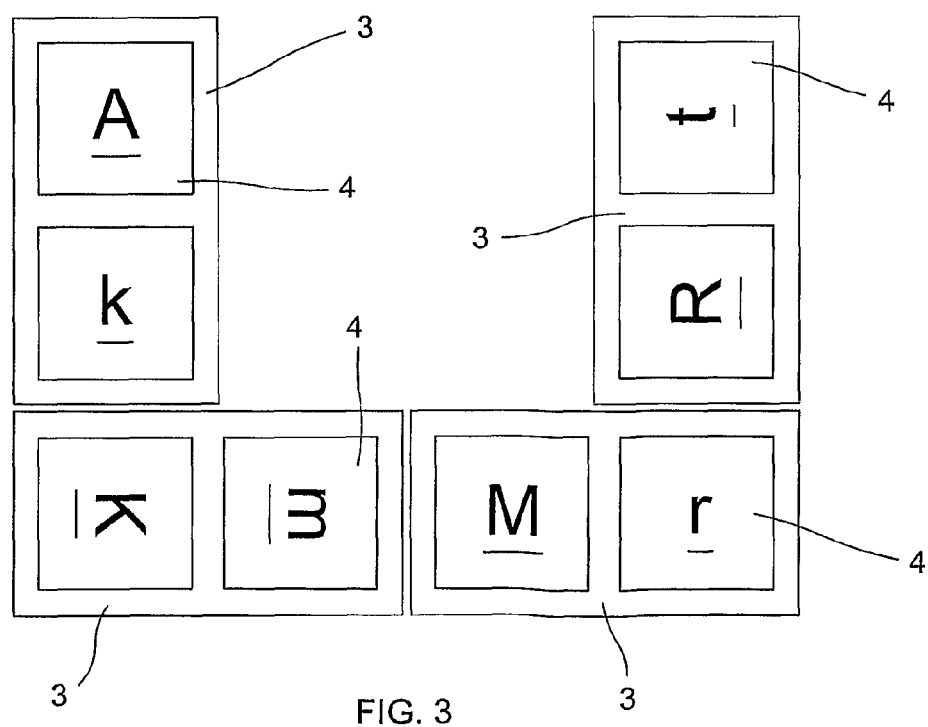
FIG. 3 illustrates a first possible configuration of equipment conforming to the invention and comprising two boards such as illustrated FIG. 2.

FIG. 3 illustrates a configuration able to be assumed by equipment conforming to the invention and comprising two boards such as illustrated FIG. 2, the configuration in this case allowing spatial associations between the inner frames, based on the indistinguishable nature of the adjacent vignette carried by these frames 3, similar to a domino game.

Figure 4:
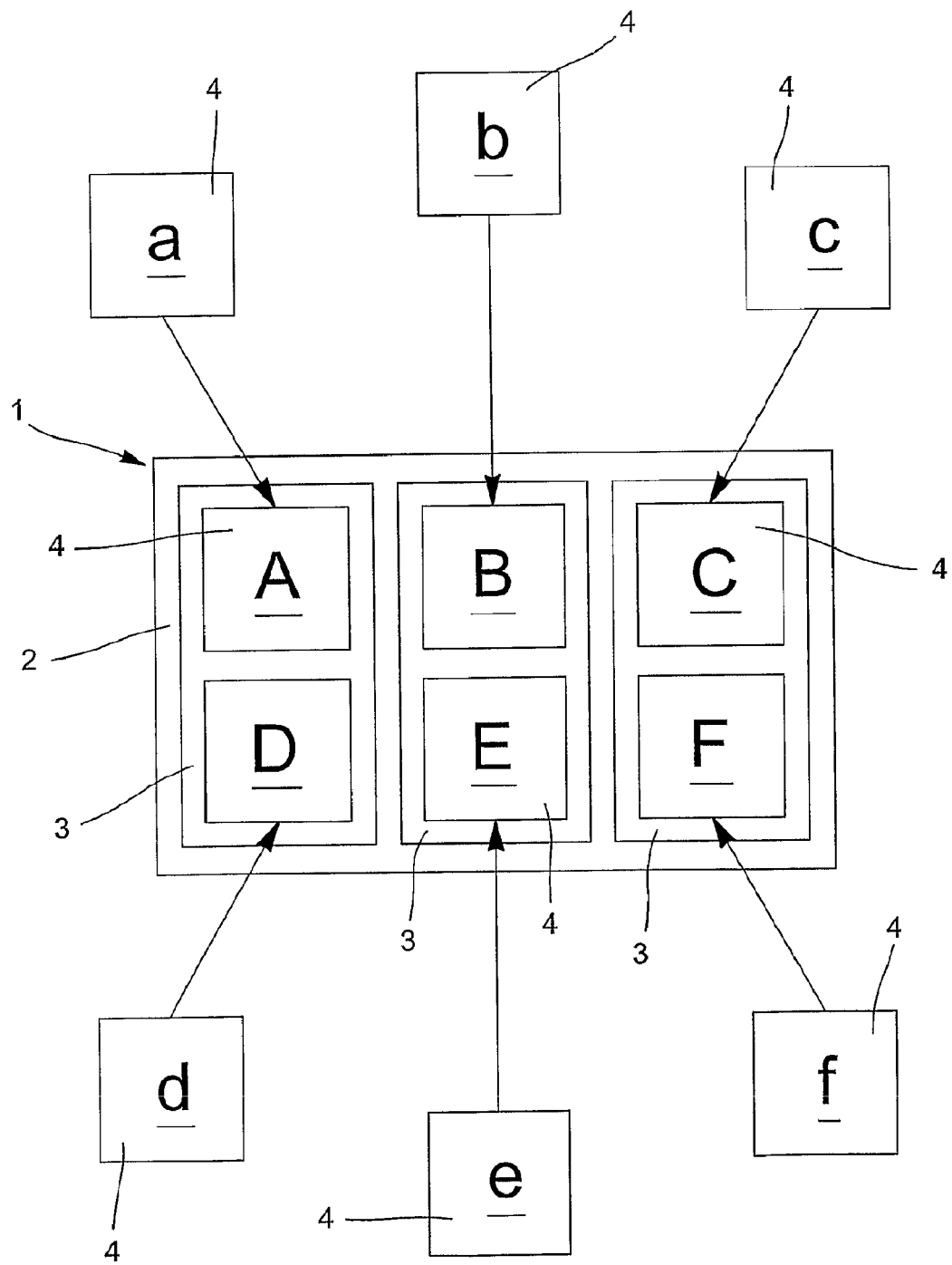
FIG. 4 illustrates a second possible configuration of equipment according to the invention and how it can be used, comprising two boards such as illustrated FIG. 2.

FIG. 4 illustrates another configuration which can be assumed by equipment conforming to the invention and comprising two boards such as illustrated FIG. 2.

In this configuration, vignettes free of any frame may be moved individually so as each cover an identical or associated vignette, belonging to the set of vignettes carried by a complete board 1.

As will be appreciated by the person skilled in the art on reading the present description, each of the vignettes 4 may comprise data on each of its two faces, this possibility further increasing the possible number of configurations of the equipment of the invention.

The invention claimed is:

1. An apparatus including educational material, the educational material comprising a plurality of information storage media of identical sizes, carrying data that is at least partly different, wherein each medium is in the form of a board comprising an outer frame, at least two inner frames, and at least four vignettes carrying at least part of said data, in that the outer frame of each board has at least two main windows (20) in each of which one of said inner frames is removably inserted, in that each inner frame of each board has at least two auxiliary windows in each of which one of said vignettes is removably inserted, in that the main windows, the inner frames, the auxiliary frames, and the vignettes of all the boards have respective identical dimensions, the inner frames therefore being mutually interchangeable and the vignettes therefore being mutually interchangeable, and in that each insert consisting of an inner frame inserted in a main window or of a vignette inserted in an auxiliary window is joined to the window in which it is inserted by a friction force applied between the edge of this insert and the edge of this window.

2. The apparatus of claim 1, wherein the outer frame, the inner frames and the vignettes of each board are of identical thickness, common to all the boards.

3. The apparatus of claim 1, wherein the outer frame, the inner frames and the vignettes of each board have a thickness of between 0.8 and 12 millimetres.

4. The apparatus of claim 1, wherein each board is cut out by laser or water-jet punching from a blank in cardboard, wood, or plastic material.

5. The apparatus of claim 1, wherein each board has three main windows and three inner frames.

6. The apparatus of claim 1, wherein the main windows and the inner frames of each board are rectangular.

7. The apparatus of claim 1, wherein each inner frame has two auxiliary windows and two vignettes.

8. The apparatus of claim 1, wherein the auxiliary windows and the vignettes of each inner frame are square.

9. The apparatus of claim 1, wherein the at least four vignettes comprise at least first and second sets of vignettes, wherein the vignettes of one same set all carry different data.

10. The apparatus of claim 9, wherein each vignette of each of the first and second sets of vignettes carries identical data or data corresponding to data of a vignette in the other of these first and second sets of vignettes.

* * * * *